(12) United States Patent
Arai

(10) Patent No.: US 10,999,120 B2
(45) Date of Patent: May 4, 2021

(54) RECEIVER, RECEPTION METHOD, AND NON-TRANSITORY COMPUTER READABLE MEDIUM STORING RECEPTION PROGRAM

(71) Applicant: NEC CORPORATION, Tokyo (JP)

(72) Inventor: Jungo Arai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/861,951

(22) Filed: Apr. 29, 2020

(65) Prior Publication Data

US 2020/0374177 A1 Nov. 26, 2020

(30) Foreign Application Priority Data

May 23, 2019 (JP) .............................. JP2019-096763

(51) Int. Cl.
*H04L 27/38* (2006.01)
*H04B 7/08* (2006.01)

(52) U.S. Cl.
CPC ........... *H04L 27/38* (2013.01); *H04B 7/0885* (2013.01)

(58) Field of Classification Search
None
See application file for complete search history.

(56) References Cited

U.S. PATENT DOCUMENTS

| | | | | |
|---|---|---|---|---|
| 4,227,152 A * | 10/1980 | Godard | ............... | H04L 25/0305 333/18 |
| 5,872,815 A * | 2/1999 | Strolle | ............... | H04L 27/0008 375/321 |
| 6,222,891 B1 * | 4/2001 | Liu | ............... | H04N 5/21 375/326 |
| 6,226,323 B1 * | 5/2001 | Tan | ............... | H04B 1/68 375/233 |
| 6,775,334 B1 * | 8/2004 | Liu | ............... | H04N 5/21 375/341 |
| 6,813,485 B2 * | 11/2004 | Sorrells | ............... | H03C 1/62 455/118 |
| 6,842,495 B1 * | 1/2005 | Jaffe | ............... | H04L 27/3827 375/326 |
| 7,130,593 B2 * | 10/2006 | Sonoda | ............... | H04B 7/08 455/101 |
| 7,308,242 B2 * | 12/2007 | Sorrells | ............... | H03C 1/62 455/118 |

(Continued)

FOREIGN PATENT DOCUMENTS

| EP | 2120347 A1 * | 11/2009 | ........... H03F 1/3247 |
|---|---|---|---|
| EP | 2234277 A1 * | 9/2010 | ......... H04L 27/2272 |

(Continued)

OTHER PUBLICATIONS

JP 2008172385 to Ogura Koji et al. (Machine Translated, Global Dossier) (Year: 2008).*

*Primary Examiner* — Berhanu Tadese

(57) ABSTRACT

With a receiver according to the present disclosure, a phase of the other modulated wave is adjusted so that a relative phase of the other modulated wave to a reference modulated wave is to be minimum and, then, a notch of the reference modulated wave is compensated with a frequency component of the other modulated wave. Thus, with the receiver according to the present disclosure, it is possible to prevent notches generated due to fading, and to improve a communication quality.

9 Claims, 6 Drawing Sheets

(56) References Cited

U.S. PATENT DOCUMENTS

| | | | | |
|---|---|---|---|---|
| 7,986,922 | B2 * | 7/2011 | Glazko | H04B 1/1036 |
| | | | | 455/100 |
| 8,321,208 | B2 * | 11/2012 | Tamura | G10L 13/06 |
| | | | | 704/205 |
| 10,447,523 | B2 * | 10/2019 | Wenzel | H04L 27/364 |
| 2001/0022813 | A1 * | 9/2001 | Tan | H04L 27/066 |
| | | | | 375/233 |
| 2001/0033625 | A1 * | 10/2001 | Ninomiya | H04N 21/482 |
| | | | | 375/316 |
| 2006/0222363 | A1 * | 10/2006 | Haishima | H04J 14/028 |
| | | | | 14/28 |
| 2008/0143580 | A1 * | 6/2008 | Glazko | H04L 27/2647 |
| | | | | 455/307 |
| 2008/0260067 | A1 * | 10/2008 | Wengerter | H04L 1/1819 |
| | | | | 375/298 |
| 2013/0308733 | A1 * | 11/2013 | Kato | H04L 25/0212 |
| | | | | 375/346 |
| 2016/0248446 | A1 * | 8/2016 | Kim | H04L 1/0068 |
| 2018/0013604 | A1 * | 1/2018 | Wenzel | H04L 27/3863 |
| 2019/0296773 | A1 * | 9/2019 | Kim | H03M 13/255 |
| 2020/0309933 | A1 * | 10/2020 | Ray | G01S 13/24 |

FOREIGN PATENT DOCUMENTS

| | | | | |
|---|---|---|---|---|
| JP | 08-172385 A | | 7/1996 | |
| JP | 08172385 A | * | 7/1996 | |
| WO | WO-2008099735 A1 | * | 8/2008 | H03F 1/3247 |
| WO | WO-2009081842 A1 | * | 7/2009 | H04L 27/2272 |
| WO | WO-2010070831 A1 | * | 6/2010 | H04L 25/03229 |
| WO | WO-2012169492 A1 | * | 12/2012 | H04B 7/10 |
| WO | WO-2015008801 A1 | * | 1/2015 | H04B 7/10 |
| WO | WO-2018047560 A1 | * | 3/2018 | H04B 1/18 |

* cited by examiner

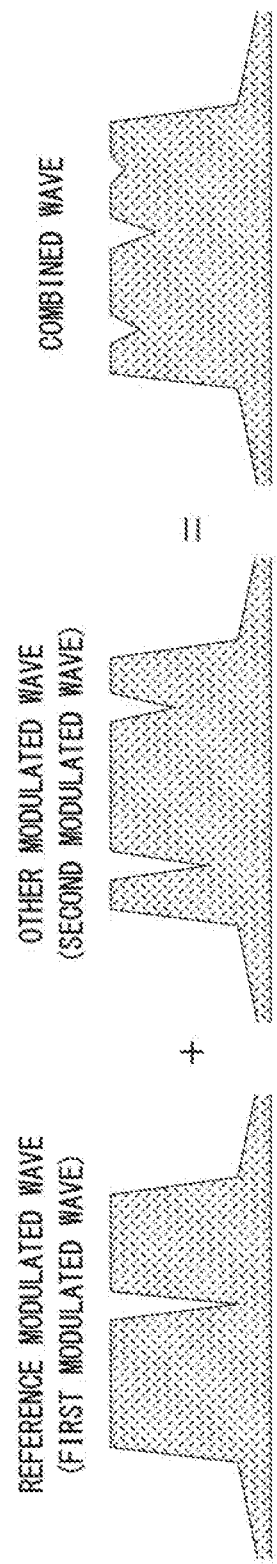

RECEIVER, RECEPTION METHOD, AND NON-TRANSITORY COMPUTER READABLE MEDIUM STORING RECEPTION PROGRAM

INCORPORATION BY REFERENCE

This application is based upon and claims the benefit of priority from Japanese patent application No. 2019-096763, filed on May 23, 2019, the disclosure of which is incorporated herein in its entirety by reference.

TECHNICAL FIELD

The present disclosure relates to a receiver, a reception method, and a reception program.

BACKGROUND ART

In the fifth generation mobile communication system (5G), in order to increase the capacity in wireless transmission, the band for wireless transmission has been widened. However, this increases the possibility that a plurality of notches due to fading is included in one modulated wave.

In addition, in order to improve the communication quality and reliability, a reception method called space diversity has been widely employed recently. In space diversity, by selecting or combining a plurality of modulated waves received through a plurality of antennas separated spacially, the communication quality and reliability are improved. However, space diversity if employed is significantly affected by fading, and the solution to this problem is required to widen the band for wireless transmission.

Japanese Unexamined Patent Application Publication No. H8-172385 discloses a solution to this problem. The diversity receiver disclosed in Japanese Unexamined Patent Application Publication No. H8-172385 prevents, in the Frequency Shift Keying (FSK) transmission system, the transmission quality from deteriorating by compensating a lack of a frequency component of a received signal with the same frequency component of another received signal.

However, Japanese Unexamined Patent Application Publication No. H8-172385 does not disclose the Quadrature Amplitude Modulation (QAM) transmission system. Specifically, since the FSK transmission system is employed in Japanese Unexamined Patent Application Publication No. H8-172385, in calculating the combining ratio of a plurality of received signal, the phase of each received signal is not adjusted for each frequency. Thus, Japanese Unexamined Patent Application Publication No. H8-172385 is inadequate for obtaining the optimal combining ratio of a plurality of received signals in the QAM transmission system, and has a problem that the communication quality cannot be sufficiently improved.

SUMMARY

A purpose of the present disclosure is to provide a receiver, a reception method, and a reception program that solve the above problems.

According to an example embodiment, a receiver includes a first discrete Fourier transformer that transforms a first modulated wave into a first frequency signal represented by a function of frequency, a second discrete Fourier transformer that transforms a second modulated wave into a second frequency signal represented by a function of frequency, a first signal-strength calculator that calculates a signal strength of each of a plurality of frequency components constituting the first frequency signal, a second signal-strength calculator that calculates a signal strength of each of a plurality of frequency components constituting the second frequency signal, a first notch detector that detects, based on a signal-strength difference between adjacent frequency components of the first frequency signal, a notch of the first frequency signal, a second notch detector that detects, based on a signal-strength difference between adjacent frequency components of the second frequency signal, a notch of the second frequency signal, a relative-phase calculator sets, among the plurality of frequency components constituting the first frequency signal, a frequency component other than frequency components including the notches detected by the first and the second notch detectors as a reference frequency component and calculates a relative phase of a frequency component of the second frequency signal corresponding to the reference frequency component, a combiner that adjusts, based on a calculation result by the relative-phase calculator, a phase of the second frequency signal and, then, compensates the frequency component including the notch among the plurality of frequency components constituting the first frequency signal with the corresponding frequency component of the second frequency signal, and an inverse discrete Fourier transformer that transforms a combined result by the combiner into a combined wave represented by a function of time.

According to an example embodiment, a reception method includes the steps of performing discrete Fourier transform to transform a first modulated wave into a first frequency signal represented by a function of frequency, performing discrete Fourier transform to transform a second modulated wave into a second frequency signal represented by a function of frequency, calculating a signal strength of each of a plurality of frequency components constituting the first frequency signal, calculating a signal strength of each of a plurality of frequency components constituting the second frequency signal, detecting, based on a signal-strength difference between adjacent frequency components of the first frequency signal, a notch of the first frequency signal, detecting, based on a signal-strength difference between adjacent frequency components of the second frequency signal, a notch of the second frequency signal, setting, among the plurality of frequency components constituting the first frequency signal, a frequency component other than frequency components including the notches as a reference frequency component and calculating a relative phase of a frequency component of the second frequency signal corresponding to the reference frequency component, adjusting, based on the calculated relative phase, a phase of the second frequency signal and, then, compensating the frequency component including the notch among the plurality of frequency components constituting the first frequency signal with the corresponding frequency component of the second frequency signal, and performing inverse discrete Fourier transform to transform a result obtained by compensating the notch of the first frequency signal with the frequency component of the second frequency signal into a combined wave represented by a function of time.

According to an example embodiment, a reception program causes a computer to execute performing discrete Fourier transform to transform a first modulated wave into a first frequency signal represented by a function of frequency, performing discrete Fourier transform to transform a second modulated wave into a second frequency signal represented by a function of frequency, calculating a signal strength of each of a plurality of frequency components constituting the first frequency signal, calculating a signal strength of each of a plurality of frequency components constituting the second frequency signal, detecting, based on a signal-strength difference between adjacent frequency components of the first frequency signal, a notch of the first frequency signal, detecting, based on a signal-strength difference between adjacent frequency components of the second frequency signal, a notch of the second frequency signal, setting, among the plurality of frequency components constituting the first frequency signal, a frequency component other than frequency components including the notches as a reference frequency component and calculating a relative phase of a frequency component of the second frequency signal corresponding to the reference frequency component, adjusting, based on the calculated relative phase, a phase of the second frequency signal and, then, compensating the frequency component including the notch among the plurality of frequency components constituting the first frequency signal with the corresponding frequency component of the second frequency signal, and performing inverse discrete Fourier transform to transform a result obtained by compensating the notch of the first frequency signal with the frequency component of the second frequency signal into a combined wave represented by a function of time.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 6 is a diagram for explaining the problem of a receiver in a conceptual phase before the first example embodiment.

EMBODIMENTS

Hereinafter, example embodiments are described with reference to the drawings. Note that, the drawings are simplified, and the technical scope of the example embodiments should not be narrowly interpreted based on the drawings. The same components are denoted by the same reference signs, and repeated explanations thereof are omitted.

The present disclosure will be described below in separate sections or example embodiments as needed. However, they are not unrelated to each other unless otherwise explicitly specified, and one of them is a modification, an application, detailed explanation, or supplementary explanation of a part or all of the other. Furthermore, when the number or the like (including the number of pieces, a numerical value, an amount, and a range) of components is referred to in the following example embodiments, the number or the like is not limited to a specific number but may be more than or less than the specific number unless otherwise explicitly specified or unless obviously limited to the specific number in principle.

Furthermore, the components (including operation steps) in the following example embodiments are not necessarily essential unless otherwise explicitly specified or unless obviously necessary in principle. Similarly, when a shape, a positional relation, or the like of the components is referred to in the following example embodiments, what is approximate to or similar to the shape or the like is substantially included unless otherwise explicitly specified or unless obviously not applicable in principle. This similarly applies to the above number or the like (including the number of pieces, a numerical value, an amount, and a range).

First Example Embodiment

Figure 1:
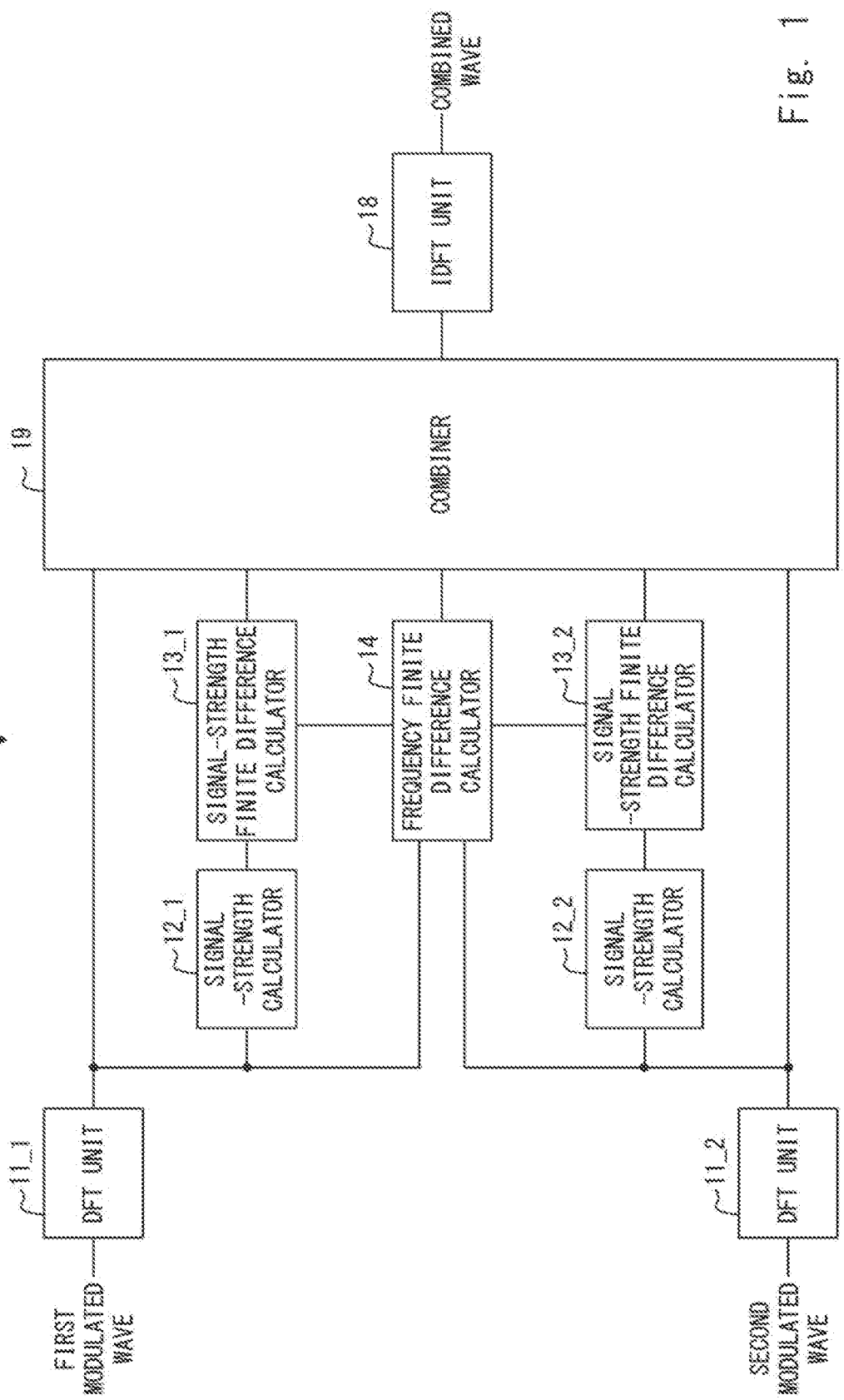
FIG. 1 is a block diagram schematically showing a receiver according to a first example embodiment.

FIG. 1 is a block diagram schematically showing a receiver 1 according to a first example embodiment. The receiver 1 according to the present example embodiment employs the QAM transmission system used for digital microwave communication and the like. The receiver 1 according to the present example embodiment further employs a space diversity reception system using two modulated waves (a first modulated wave and a second modulated wave).

As shown in FIG. 1, the receiver 1 includes discrete Fourier transformers (DFT unit) 11_1 and 11_2, signal-strength calculators 12_1 and 12_2, signal-strength finite difference calculators (notch detectors) 13_1 and 13_2, a frequency finite difference calculator (relative-phase calculator) 14, a combiner 19, and an inverse discrete Fourier transformer (IDFT unit) 18.

Figure 2:
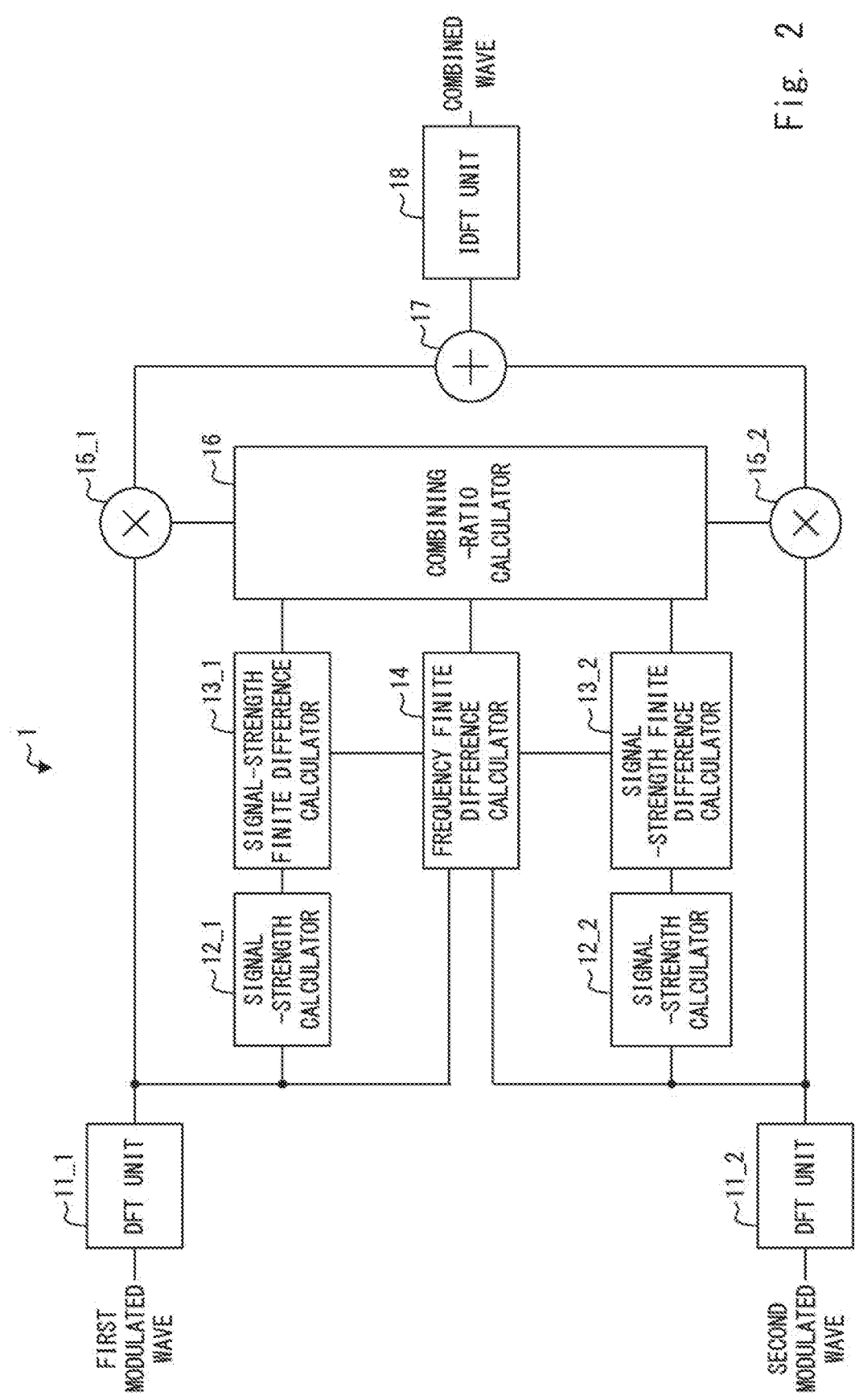
FIG. 2 is a block diagram showing a configuration example of the receiver according to the first example embodiment.

FIG. 2 is a block diagram showing a more specific configuration example of the receiver 1. As shown in FIG. 2, the combiner 19 includes, for example, multipliers 15_1 and 15_2, a combining-ratio calculator 16, and an adder 17.

The discrete Fourier transformer 11_1 performs discrete Fourier transform to a first modulated wave received through, for example, a first antenna (not shown) to output a first frequency signal. In other words, the discrete Fourier transformer 11_1 transforms the first modulated wave represented by a function of time into the first frequency signal represented by a function of frequency. The first frequency signal is divided into a preset number of frequency components (frequency domains and frequency bands), and is supplied to the signal-strength calculator 12_1, the frequency finite difference calculator 14, and the multiplier 15_1.

The discrete Fourier transformer 11_2 performs discrete Fourier transform to a second modulated wave received through, for example, a second antenna (not shown) separated spatially from the first antenna to output a second frequency signal. In other words, the discrete Fourier transformer 11_2 transforms the second modulated wave represented by a function of time into the second frequency signal represented by a function of frequency. The second frequency signal is divided into a preset number of frequency components, and is supplied to the signal-strength calculator 12_2, the frequency finite difference calculator 14, and the multiplier 15_2.

The signal-strength calculator 12_1 calculates the signal strength of each frequency component of the first frequency signal.

Here, when the input signal (complex number) of each frequency component contained in the first frequency signal is x+yi, the signal strength (power) of each frequency component is represented as the following expression (1).

$$(x+yi)(x-yi)=x^2+y^2 \qquad (1)$$

Note that, the amplitude of each frequency component may be calculated as the signal strength. In this case, the signal strength (amplitude) of each frequency component is expressed as the following expression (2).

$$\sqrt{((x+yi)(x-yi))}=\sqrt{(x^2+y^2)} \qquad (2)$$

The signal-strength calculator 12_1 integrates or averages and outputs the signal-strength calculation result of each frequency. The signal-strength calculation result of each frequency component of the first frequency signal is supplied to the signal-strength finite difference calculator 13_1.

Similarly, the signal-strength calculator 12_2 calculates and outputs the signal strength of each frequency component of the second frequency signal. The signal-strength calculation result of each frequency component of the second frequency signal is supplied to the signal-strength finite difference calculator 13_2.

The signal-strength finite difference calculator 13_1 calculates, from the signal strength of each frequency component of the first frequency signal calculated by the signal-strength calculator 12_1, the signal strength of one entire modulated wave (the entire first modulated wave), and the signal-strength difference between adjacent frequency components of the modulated wave. Here, the finite difference calculator 13_1 determines that a notch is generated at a frequency domain (position) where the signal-strength difference between adjacent frequency components among a plurality of frequency components of the modulated wave is a predetermined value or more, and outputs the determination result (the presence and position of the notch). This determination result (especially, the position of the notch) is supplied to the frequency finite difference calculator 14. In addition, this determination result, and the signal-strength calculation result of the entire modulated wave are supplied to the combining-ratio calculator 16. Note that, the signal strength of the entire modulated wave is used to calculate the combining ratio when the first modulated wave has no notch.

The signal-strength finite difference calculator 13_2 calculates, from the signal strength of each frequency component of the second frequency signal calculated by the signal-strength calculator 12_2, the signal strength of one entire modulated wave (the entire second modulated wave), and the signal-strength difference between adjacent frequency components of the modulated wave. Here, the finite difference calculator 13_2 determines that a notch is generated at a frequency domain (position) where the signal strength difference between adjacent frequency components among a plurality of frequency components of the modulated wave is a predetermined value or more, and outputs the determination result (the presence and position of the notch). This determination result (especially the position of the notch) is supplied to the frequency finite difference calculator 14. In addition, this determination result, and the signal-strength calculation result of the entire modulated wave are supplied to the combining-ratio calculator 16. Note that, the signal strength of the entire modulated wave is used to calculate the combining ratio when the second modulated wave has no notch.

The frequency finite difference calculator 14 sets, among a plurality of frequency components constituting a reference modulated wave (for example, the first modulated wave), a frequency component other than the notch position of each modulated wave as a reference frequency component. Then, the frequency finite difference calculator 14 calculates, by complex conjugate calculation, the relative phase of a frequency component of a modulated wave other than the reference modulated wave (for example, the second modulated wave) corresponding to the reference frequency component (specifically, a frequency component having the same frequency as that of the reference frequency component).

For example, when the input signal (complex number) of the reference frequency component is a+bi and the input signal of another frequency component is x+yi, the calculation result regarding the input signal of the other frequency component is represented by the following expression (3).

$$(x+yi)(a-bi) \qquad (3)$$

Then, the frequency finite difference calculator 14 integrates or averages the calculated result and outputs it as a relative phase signal. This relative phase signal is supplied to the combining-ratio calculator 16.

The combining-ratio calculator 16 calculates, based on the calculation results by the signal-strength finite difference calculators 13_1 and 13_2 and the relative phase signal calculated by the frequency finite difference calculator 14, the combining ratio and combined phase for the first and second modulated waves. In the following, specific procedures of the combining-ratio calculator 16 for calculating the combining ratio and combined phase are described with reference to FIGS. 3 and 4.

Figure 3:
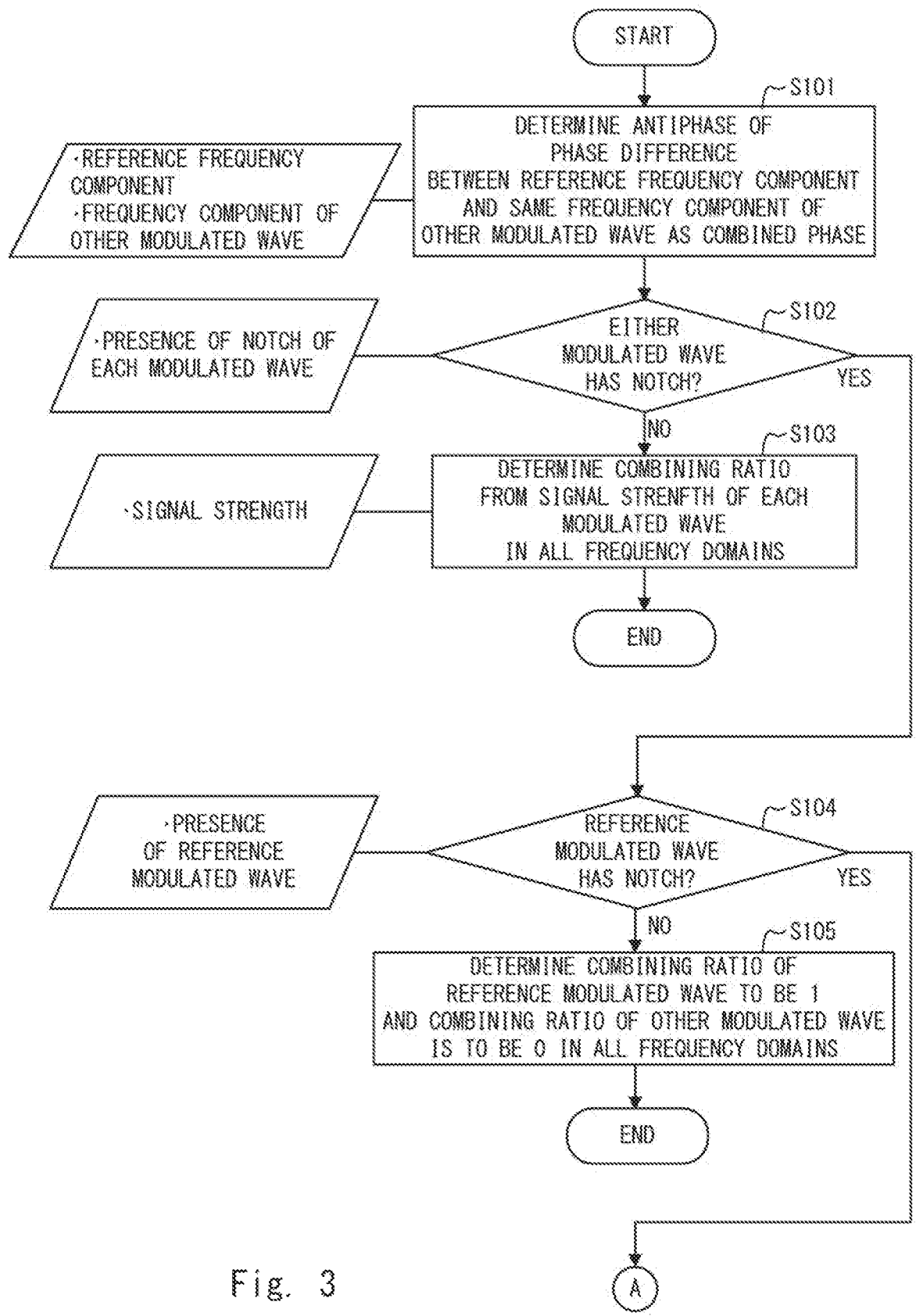
FIG. 3 is a flowchart showing specific procedures of a combining-ratio calculator provided in the receiver shown in FIG. 2 for calculating a combining ratio and combined phase.
Figure 4:
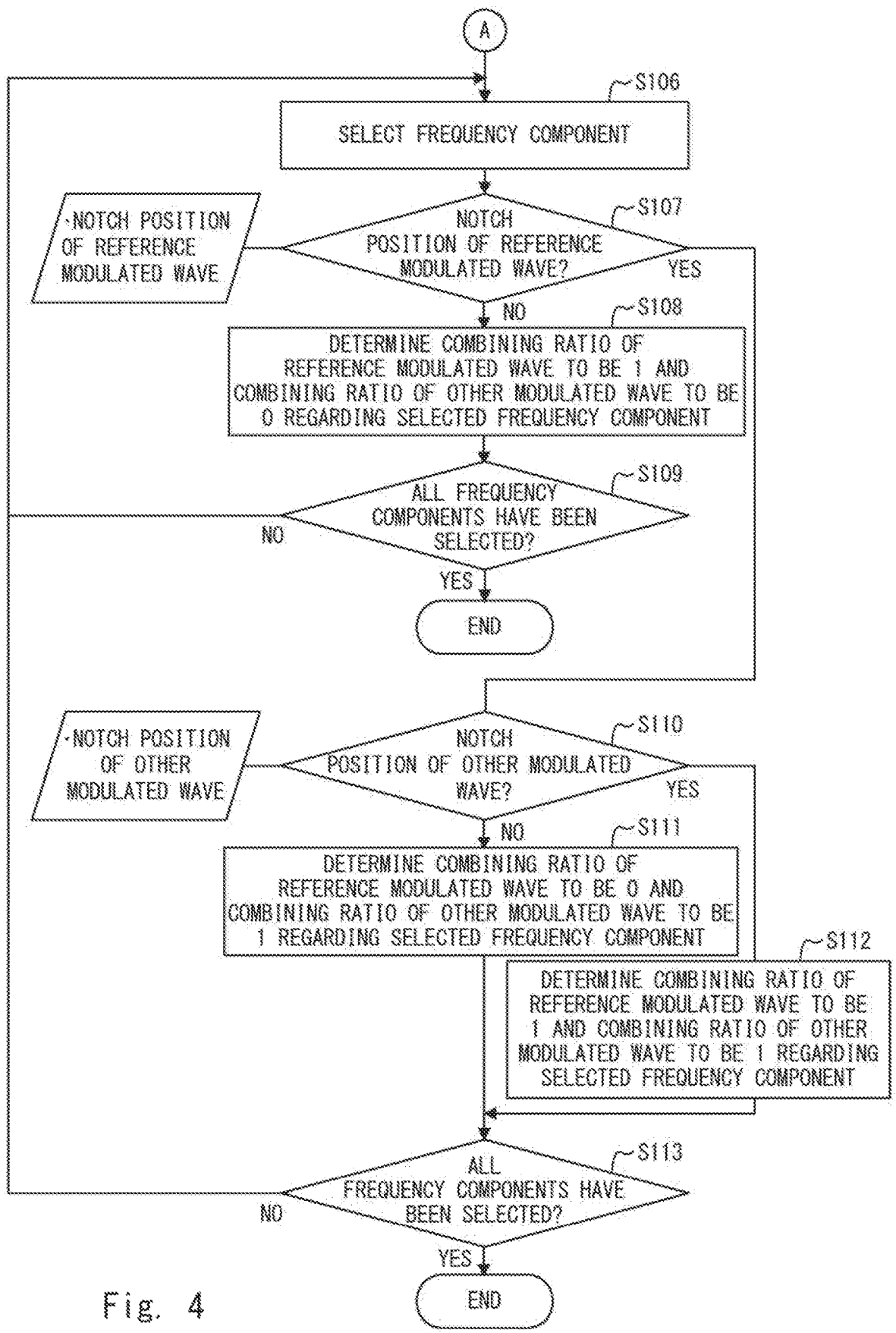
FIG. 4 is a flowchart showing the specific procedures of the combining-ratio calculator provided in the receiver shown in FIG. 2 for calculating the combining ratio and combined phase.

FIGS. 3 and 4 are flowcharts showing specific procedures of the combining-ratio calculator 16 for calculating the combining ratio and combined phase of each modulated wave.

First, regarding each frequency component of a modulated wave other than the reference modulated wave (the other modulated wave), the antiphase of the phase difference between the reference frequency component determined by the finite difference calculator 14 and the corresponding frequency component of the other modulated wave is determined as the combined phase (step S101).

Then, processing is performed according to whether each modulated wave has a notch (step S102). For example, if a plurality of modulated waves (the first and second modulated waves in this example) does not have any notch (NO in step S102), in all the bands (all the frequency domains) of the modulated wave, the combining ratio according to the sum of the signal strengths of each modulated wave is determined. Note that, the combining ratio at this time is determined by, for example, equal-gain combining or maximum-ratio combining.

On the other hand, if any one of the plurality of modulated waves has a notch (YES in step S102), processing is performed according to the type of the modulated wave having the notch (step S104). Note that, the present example embodiment focuses on preventing deterioration by combining instead of obtaining the gain by combining if any one of the plurality of modulated waves has a notch.

Thus, if, for example, a modulated wave other than the reference modulated wave has a notch (NO in step S104), in all the bands (all the frequency domains) of the modulated wave, the combining ratio of the reference modulated wave is determined to be 1, and the combining ratio of the other modulated wave is determined to be 0, for example (step S105).

On the other hand, if the reference modulated wave has a notch (YES in step S104), the following processing is performed. First, among all the frequency components of the reference modulated wave, an unselected frequency component is selected (step S106).

Then, it is determined whether the selected frequency component corresponds to the notch position (frequency component) of the reference modulated wave (step S107). If the selected frequency component does not correspond to the notch position of the reference modulated wave (NO in step S107), regarding the selected frequency component, the combining ratio of the reference modulated wave is determined to be 1, and the combining ratio of the other modulated wave is determined to be 0, for example (step S108). Then, if all the frequency components have not been selected (NO in step S109), the processing returns to step S106, or if all the frequency components have been selected (YES in step S109), the processing is terminated.

If the selected frequency component corresponds to the notch position of the reference modulated wave (YES in step S107), then, it is determined whether the selected frequency component corresponds to the notch position of the other modulated wave (step S110). If the selected frequency component does not correspond to the notch position of the other modulated wave (NO in step S110), regarding the selected frequency component, the combining ratio of the reference modulated wave is determined to be 0, and the combining ratio of the other modulated wave is determined to be 1, for example (step S111).

On the other hand, if the selected frequency component corresponds to the notch position of the other modulated wave (YES in step S110), regarding the selected frequency component, the combining ratio of the reference modulated wave is determined to be 1, and the combining ratio of the other modulated wave is determined to be 1, for example (step S112).

Then, if all the frequency components have not been selected (NO in step S113), the processing returns to step S106, or if all the frequency component have been selected (YES in step S113), the processing is terminated.

The combining-ratio calculator 16 calculates, with the above procedures, the combining ratio and combined phase of each frequency component of each modulated wave. The calculation results are supplied to the multipliers 15_1 and 15_2.

The multiplier 15_1 multiplies the combining ratio calculated by the combining-ratio calculator 16 to each frequency component of the first frequency signal output from the discrete Fourier transformer 11_1. The multiplier 15_2 multiplies the combining ratio calculated by the combining-ratio calculator 16 to each frequency component of the second frequency signal output from the discrete Fourier transformer 11_2. Note that, the combined phase is not multiplied to the frequency signal of the reference modulated wave (for example, the first frequency signal), but the combined phase is multiplied to the frequency signal of the other modulated wave (for example, second frequency signal). The multiplication results of the multipliers 15_1 and 15_2 are supplied to the adder 17.

The adder 17 combines the multiplication results of the multipliers 15_1 and 15_2. The combined result by the adder 17 is supplied to the inverse discrete Fourier transformer 18.

The inverse discrete Fourier transformer 18 performs inverse discrete Fourier transformer to the combined result by the adder 17. In other words, the inverse discrete Fourier transformer 18 transforms the combined result by the adder 17 represented by a function of frequency into a combined wave represented by a function of time (the combined modulated wave).

Figure 5:
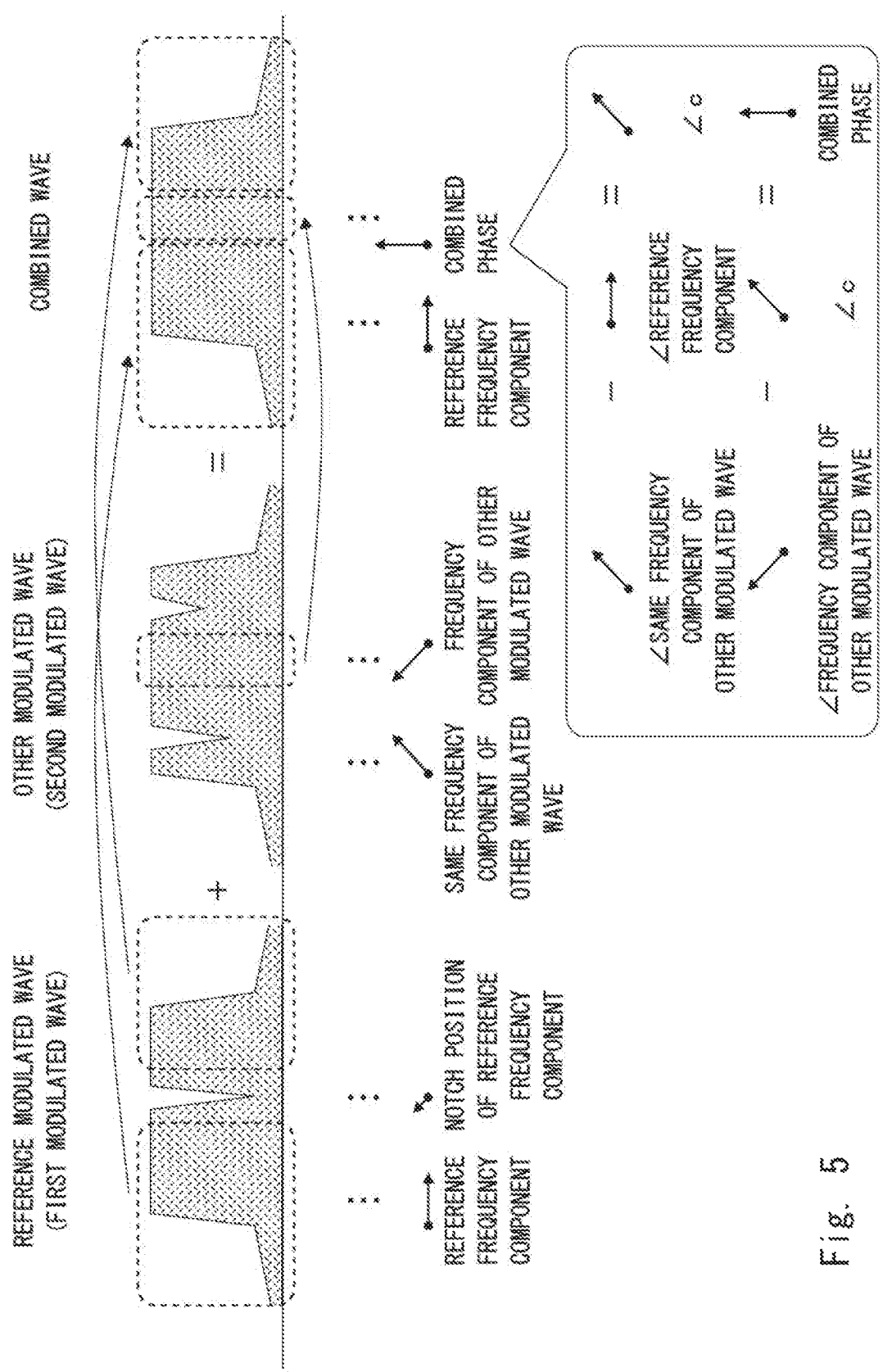
FIG. 5 is a diagram for explaining effects of the receiver according to the first example embodiment.

In the following, with reference to FIGS. 5 and 6, the effects of the receiver 1 according to the present example embodiment are described. FIG. 5 is a diagram for explaining the effects of the receiver 1 according to the present example embodiment. FIG. 6 is a diagram for explaining the problem of a receiver in a conceptual phase before the first example embodiment. Note that, the main purpose of the present example embodiment is to improve the characteristics of space diversity under fading environment, and the description for the case with no fading influence is omitted.

FIGS. 5 and 6 show examples when two modulated waves having notches are combined. Specifically, the first modulated wave, which is the reference modulated wave, has one deep notch, and the second modulated wave, which is the other modulated wave, has two notches shallower than the notch of the first modulated wave.

First, as shown in FIG. 6, with the receiver in a conceptual phase before the present example embodiment, combining is performed in consideration only of the signal strength of each modulated wave. In this case, since the signal strength of the first modulated wave is determined to be equal to the signal strength of the second modulated wave, the combining ratio between the reference modulated wave (for example, the first modulated wave) and the other modulated wave (for example, the second modulated wave) is 1:1, and the notches remains in the combined result.

In contrast, as shown in FIG. 5, with the receiver 1 according to the present example embodiment, the phase of the other modulated wave is adjusted so that the relative phase of the other modulated wave to the reference modulated wave is to be minimum and, then, the notch of the reference modulated wave is compensated with a frequency component of the other modulated wave. Thus, notches are prevented in the combined result of the reference modulated wave and the other modulated wave. Especially, the notch of the reference modulated wave is replaced with the frequency component of the other modulated wave in the present example embodiment, and the notches do not remain in the combined result.

As described above, with the receiver 1 according to the present example embodiment, the phase of the other modulated wave is adjusted so that the relative phase of the other modulated wave to the reference modulated wave is to be minimum and, then, the notch of the reference modulated wave is compensated with the frequency component of the other modulated wave. Thus, with the receiver 1 according to the present example embodiment, it is possible to prevent notches generated due to fading, and to improve the communication quality.

It has been described that the combining ratio of a frequency component having a notch is 0 or of a frequency component with no notch is 1 in the present example embodiment, but the combining ratio is not limited thereto. The combining ratio is not limited to 0 or 1, and may be any ratio.

In addition, it has been described that a space-diversity reception method using two modulated waves (a first modulated wave and a second modulated wave) is employed as an example in the present example embodiment, but the number of modulated waves is not limited thereto, and a space-diversity reception method using three or more modulated waves may be employed.

For example, when a space-diversity reception method using three or more modulated waves is employed, the receiver 1 is required to further include, for a third modulated wave, a discrete Fourier transformer 11_3, a signal-strength calculator 12_3, and a signal-strength finite difference calculator (notch detector)13_3. At this time, the frequency finite difference calculator 14 sets, among a plurality of frequency components constituting a reference modulated wave (for example, the first modulated wave), a frequency component other than notch positions of the first to third modulated waves as a reference frequency component. Then, the frequency finite difference calculator 14 calculates, by complex conjugate calculation, the relative phase of a frequency component of a modulated wave other than the reference modulated wave (for example, the second or third modulated wave) corresponding to the reference frequency component (specifically, a frequency component having the same frequency as that of the reference frequency component). The combiner 19 adjusts the phase of the other modulated wave so that the relative phase of the other modulated wave (the second or third modulated wave) to the reference modulated wave (for example, the first modulated wave) is to minimum and, then, compensates the notch of the reference modulated wave with the frequency component of the other modulated wave.

The example embodiment of the present disclosure has been specifically described, but the specific configuration is not limited to the above, and the design and the like can be variously changed without departing from the scope of the present disclosure.

The present disclosure has been described as a hardware configuration in the above example embodiment, but the present disclosure is not limited thereto. The present disclosure can be also achieved by causing a central processing unit (CPU) to execute a computer program for reception processing of the receiver 1.

In addition, the above program can be stored in any type of non-transitory computer readable medium and be supplied to a computer. The non-transitory computer readable medium includes any type of tangible storage medium. The non-transitory computer readable medium includes, for example, a magnetic recording medium, a magnetooptical recording medium, a compact disc read only memory (CD-ROM), a CD-R, a CD-R/W, and a semiconductor memory. The magnetic recording medium is, for example, a flexible disk, a magnetic tape, or a hard disk drive. The magnetooptical recording medium is, for example, a magnetooptical disk. The semiconductor memory is, for example, a mask ROM, a programmable ROM (PROM), an erasable PROM (EPROM), a flash ROM, or a random access memory (RAM). Alternatively, the program may be supplied to a computer with any type of transitory computer-readable medium. The transitory computer-readable medium includes, for example, an electrical signal, an optical signal, and an electromagnetic wave. The transitory computer-readable medium can supply the program to a computer through a wired communication channel, such as an electrical cable, an optical fiber, or the like, or a radio communication channel.

According to the example embodiments, it is possible to provide a receiver, a reception method, and a reception program that are capable of improving communication quality.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A receiver comprising:
   a first discrete Fourier transformer configured to transform a first modulated wave into a first frequency signal represented by a function of frequency;
   a second discrete Fourier transformer configured to transform a second modulated wave into a second frequency signal represented by a function of frequency;
   a first signal-strength calculator configured to calculate a signal strength of each of a plurality of frequency components constituting the first frequency signal;
   a second signal-strength calculator configured to calculate a signal strength of each of a plurality of frequency components constituting the second frequency signal;
   a first notch detector configured to detect, based on a signal-strength difference between adjacent frequency components of the first frequency signal, a notch of the first frequency signal;
   a second notch detector configured to detect, based on a signal-strength difference between adjacent frequency components of the second frequency signal, a notch of the second frequency signal;
   a relative-phase calculator configured to set, among the plurality of frequency components constituting the first frequency signal, a frequency component other than frequency components including the notches detected by the first and the second notch detectors as a reference frequency component and to calculate a relative phase of a frequency component of the second frequency signal corresponding to the reference frequency component;
   a combiner configured to adjust, based on a calculation result by the relative-phase calculator, a phase of the second frequency signal and, then, to compensate the frequency component including the notch among the plurality of frequency components constituting the first frequency signal with the corresponding frequency component of the second frequency signal; and
   an inverse discrete Fourier transformer configured to transform a result of the combination made by the combiner into a combined wave represented by a function of time.

2. The receiver according to claim 1, wherein the combiner is configured to adjust, based on the calculation result by the relative-phase calculator, the phase of the second frequency signal and, then, to replace the frequency component including the notch among the plurality of frequency components constituting the first frequency signal with the corresponding frequency component of the second frequency signal.

3. The receiver according to claim 1, wherein the combiner is configured to simply output, when it has been detected that the first frequency signal does not have any notch, the first frequency signal.

4. The receiver according to claim 1, further comprising:
   a third discrete Fourier transformer configured to transform a third modulated wave into a third frequency signal represented by a function of frequency;
   a third signal-strength calculator configured to calculate a signal strength of each of a plurality of frequency components constituting the third frequency signal; and
   a third notch detector configured to detect, based on a signal-strength difference between adjacent frequency components of the third frequency signal, a notch of the third frequency signal, wherein
   the relative-phase calculator is configured to set, among the plurality of frequency components constituting the first frequency signal, a frequency component other than the frequency components including the notches detected by the first to the third notch detectors as a reference frequency component and to calculate a relative phase of a frequency component of each of the second and the third frequency signals corresponding to the reference frequency component, the combiner is configured to adjust, based on the calculation result by the relative-phase calculator, a phase of each of the second and the third frequency signals and, then, to compensate the frequency component including the notch among the plurality of frequency components constituting the first frequency signal with the corresponding frequency component of either one of the second and the third frequency signals.

5. The receiver according to claim 1 employing a quadrature amplitude modulation (QAM) transmission system.

6. A reception method comprising the steps of:

performing discrete Fourier transform to transform a first modulated wave into a first frequency signal represented by a function of frequency;

performing discrete Fourier transform to transform a second modulated wave into a second frequency signal represented by a function of frequency;

calculating a signal strength of each of a plurality of frequency components constituting the first frequency signal;

calculating a signal strength of each of a plurality of frequency components constituting the second frequency signal;

detecting, based on a signal-strength difference between adjacent frequency components of the first frequency signal, a notch of the first frequency signal;

detecting, based on a signal-strength difference between adjacent frequency components of the second frequency signal, a notch of the second frequency signal;

setting, among the plurality of frequency components constituting the first frequency signal, a frequency component other than frequency components including the notches as a reference frequency component and calculating a relative phase of a frequency component of the second frequency signal corresponding to the reference frequency component;

adjusting, based on the calculated relative phase, a phase of the second frequency signal and, then, compensating the frequency component including the notch among the plurality of frequency components constituting the first frequency signal with the corresponding frequency component of the second frequency signal; and performing inverse discrete Fourier transform to transform a result obtained by compensating the notch of the first frequency signal with the frequency component of the second frequency signal into a combined wave represented by a function of time.

7. The reception method according to claim 6, wherein the compensating of the notch of the first frequency signal with the frequency component of the second frequency signal includes adjusting, based on the calculated relative phase, the phase of the second frequency signal and, then replacing the frequency component including the notch among the plurality of frequency components constituting the first frequency signal with the corresponding frequency component of the second frequency signal.

8. A non-transitory computer readable medium storing a reception program causing a computer to:

perform discrete Fourier transform to transform a first modulated wave into a first frequency signal represented by a function of frequency;

perform discrete Fourier transform to transform a second modulated wave into a second frequency signal represented by a function of frequency;

calculate a signal strength of each of a plurality of frequency components constituting the first frequency signal;

calculate a signal strength of each of a plurality of frequency components constituting the second frequency signal;

detect, based on a signal-strength difference between adjacent frequency components of the first frequency signal, a notch of the first frequency signal;

detect, based on a signal-strength difference between adjacent frequency components of the second frequency signal, a notch of the second frequency signal;

set, among the plurality of frequency components constituting the first frequency signal, a frequency component other than frequency components including the notches as a reference frequency component and calculate a relative phase of a frequency component of the second frequency signal corresponding to the reference frequency component;

adjust, based on the calculated relative phase, a phase of the second frequency signal, and then compensate the frequency component including the notch among the plurality of frequency components constituting the first frequency signal with the corresponding frequency component of the second frequency signal; and perform inverse discrete Fourier transform to transform a result obtained by compensating the notch of the first frequency signal with the frequency component of the second frequency signal into a combined wave represented by a function of time.

9. The non-transitory computer readable medium storing the reception program according to claim 8, wherein the compensating of the notch of the first frequency signal with the frequency component of the second frequency signal includes adjusting, based on the calculated relative phase, the phase of the second frequency signal, and then replacing the frequency component including the notch among the plurality of frequency components constituting the first frequency signal with the corresponding frequency component of the second frequency signal.

* * * * *